US005093607A

United States Patent [19]

Fujita et al.

[11] Patent Number: 5,093,607

[45] Date of Patent: Mar. 3, 1992

[54] INDUSTRIAL ROBOT SYSTEM

[75] Inventors: Akira Fujita; Hisao Kato, both of Aichi, Japan

[73] Assignee: Mitsubishi Denki K.K., Tokyo, Japan

[21] Appl. No.: 574,038

[22] Filed: Aug. 29, 1990

[30] Foreign Application Priority Data

Sep. 19, 1989 [JP] Japan .................................. 1-242549

[51] Int. Cl.[5] .............................. G05B 1/06; B25J 9/06

[52] U.S. Cl. .................................... 318/567; 318/634; 318/663; 318/434; 318/568.1; 901/9; 901/20; 395/1

[58] Field of Search ................................ 318/560-646; 364/513, 474; 901/3, 9, 12, 15, 17-23

[56] References Cited

U.S. PATENT DOCUMENTS 4,055,787 10/1977 Beadle et al. ........................ 318/591
4,631,464 12/1986 Kato .................................... 318/563
4,636,699 1/1987 Kato .................................... 318/563
4,638,227 1/1987 Katayama et al. .................. 318/565
4,668,157 5/1987 Kato et al. ....................... 318/634 X
4,712,053 12/1987 Numata .............................. 318/663
4,972,310 11/1990 Onodera et al. ............... 364/474.02

*Primary Examiner*—Paul Ip
*Attorney, Agent, or Firm*—Sughrue, Mion, Zinn, Macpeak & Seas

[57] ABSTRACT

An industrial robot system comprises a control unit including programs for operating an industrial robot and a peripheral device of the industrial robot according to the programs; a memory for storing the steps of the programs which are effected when the industrial robot and peripheral device are stopped unintentionally; a detector for detecting the conditions of the industrial robot and peripheral device when the industrial robot and peripheral device are stopped unintentionally; and a restarter for starting the industrial robot and peripheral device again when the contents of the memory coincide with the conditions detected by the detectors.

1 Claim, 4 Drawing Sheets

CONTROL DEVICE
MEMORY UNIT
RESTARTER
PROGRAM CONTROL UNIT
ANNUNCIATOR
1
1a
2
2a
3
4
5
5'
6
7
8
9
10
11

1a
1
4
5
2
3
7
3
5
7
2a
3
5'

ENTRANCE
UNINTENTIONAL STOP
101
STORING STEP OF PROGRAM
102
DETECTING CONDITION OF STOP
103
n=1
104
105
STEP OF PROGRAM CORRESPONDS TO CONDITION OF STOP ?
NO
YES
SEARCHING FOR STEP OF PROGRAM WHICH CORRESPONDS TO CONDITION OF STOP
107
n=n+1
108
109
n=4 ?
NO
YES
GIVING ALARM FOR OCCURRENCE OF TROUBLE
110
106
RESTART
EXIT

INDUSTRIAL ROBOT SYSTEM

BACKGROUND OF THE INVENTION

1. Field of the Invention

This invention relates to industrial robot systems, and more particularly to a measure which is taken when an industrial robot system is stopped unintentionally.

2. Prior Art

As-disclosed by Japanese Patent Application (OPI) No. 88301/1986, an industrial robot system is available which is provided with earthquake control means operating on an earthquake detector at the occurrence of an earthquake.

In the industrial robot system, an earthquake control operation is carried out to stop the operation of the industrial robot or retract it from line when an earthquake occurs.

The above-described conventional industrial robot system suffers from the following problem: When the industrial robot system is stopped unintentionally, the actual condition of the industrial robot or its peripheral materials such as work materials is often deviated from that required by the operating program for instance because it is manually moved after the unintentional stop. Hence, when the industrial robot system is started again, troubles may occur, for instance the industrial robot may perform unexpected operations to damage the peripheral equipment.

SUMMARY OF THE INVENTION

Accordingly, an object of this invention is to eliminate the above-described difficulty accompanying a conventional industrial robot system. More specifically, an object of the invention is to provide an industrial robot system which, when it is stopped unintentionally and then started again, will operates correctly.

The foregoing object of the invention has been achieved by the provision of an industrial robot system which, according to the invention, comprises: memory means for storing the steps of programs which are effected for the industrial robot and its peripheral devices when the latter are stopped unintentionally; detector means for detecting the conditions of the industrial robot and peripheral device when the latter are stopped unintentionally; restarter means for starting the industrial robot and peripheral device again; and program control means for controlling the execution of the program when the industrial robot and peripheral device are stopped unintentionally; and annunciator means which is energized when it is determined that the restarting operation is impossible.

In the case where, in the industrial robot system thus organized, the industrial robot and its peripheral device are stopped unintentionally, the restarter is operated when the outputs of the memory means and the detector means coincide with each other. Furthermore, the program control means operates to search for the steps of the programs which correspond to the outputs of the detector means. When it is determined that the system cannot be restarted, the system is left as it is, with the annunciator energized.

DETAILED DESCRIPTION OF THE PREFERRED EMBODIMENTS

Figure 1:
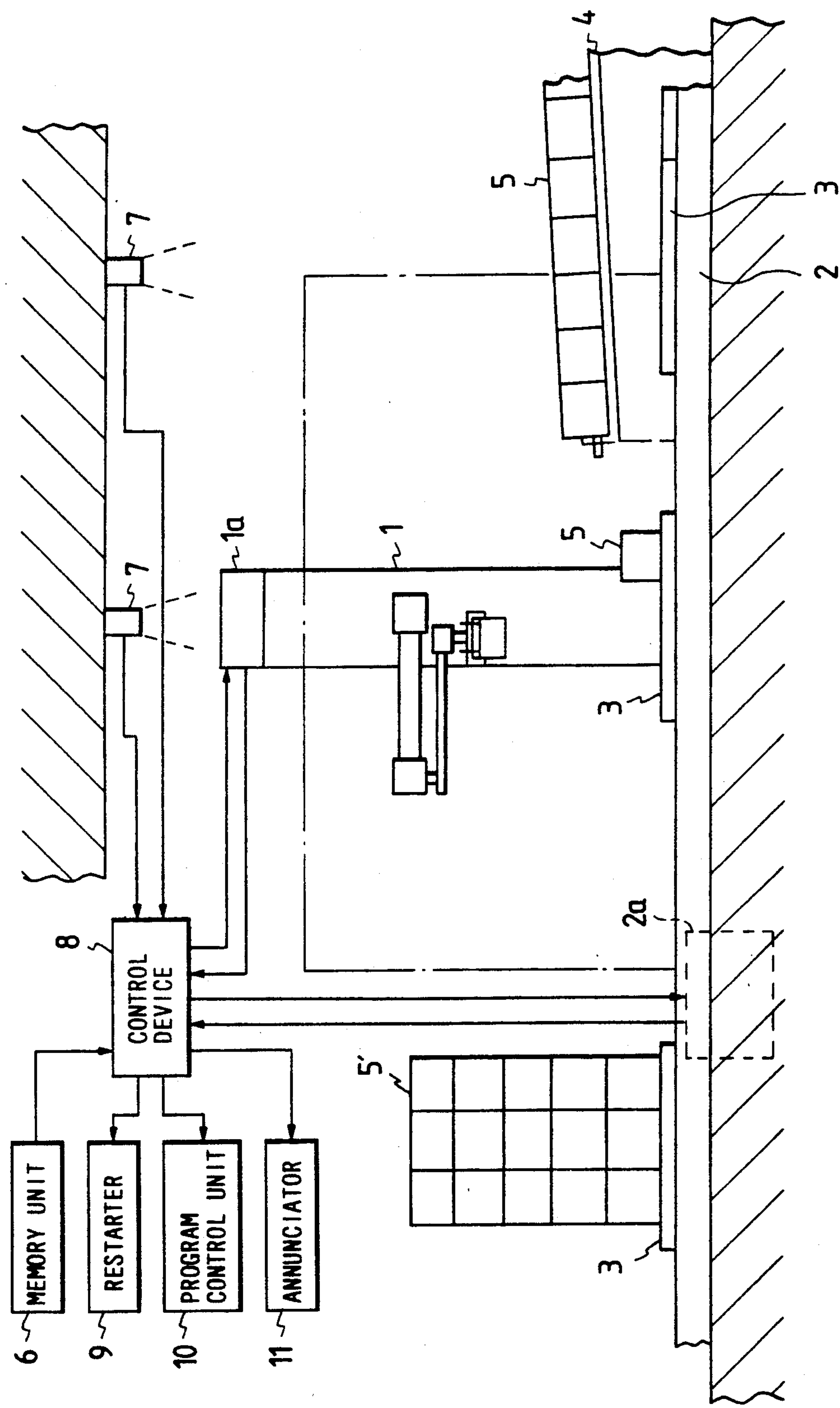
FIG. 1 is an explanatory diagram outlining the entire arrangement of one example of an industrial robot system according to this invention.
Figure 2:
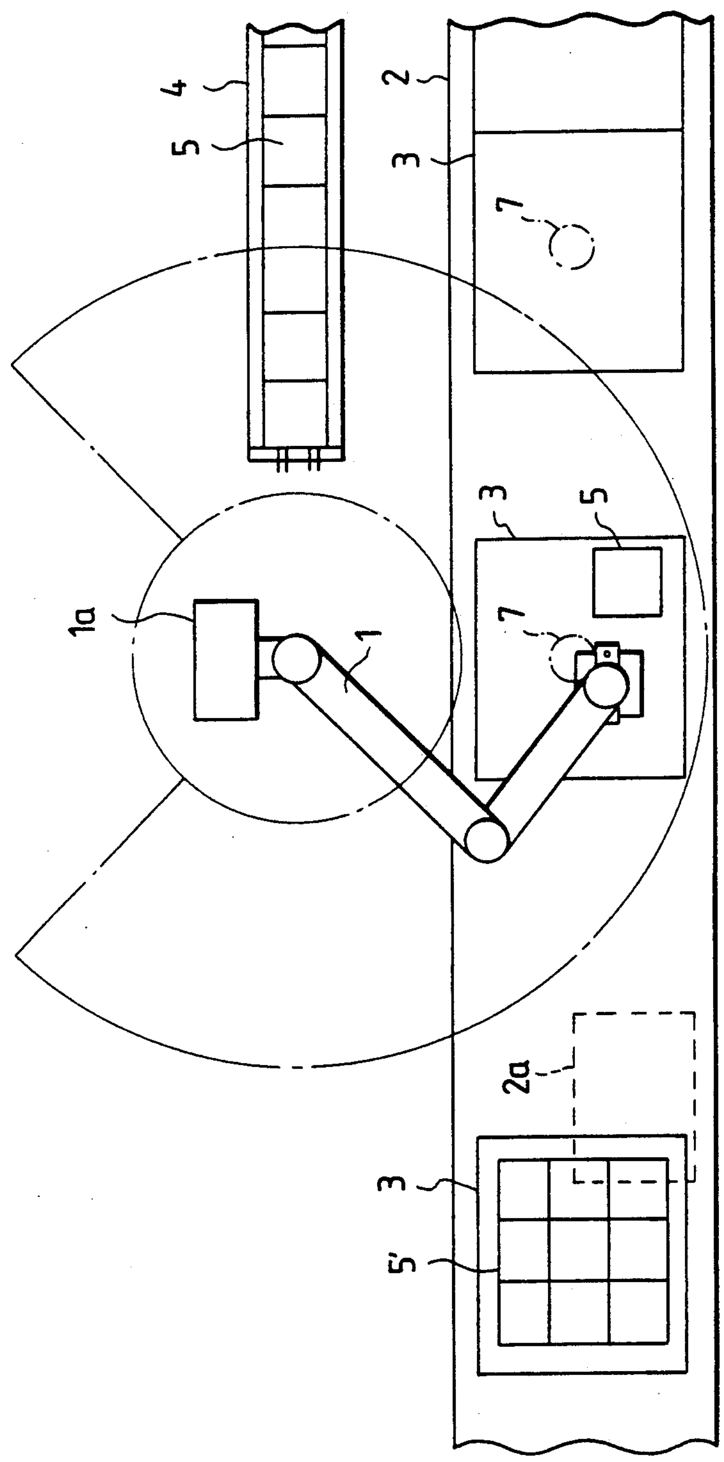
FIG. 2 is a plan view of the industrial robot system shown in FIG. 1.
Figure 3:
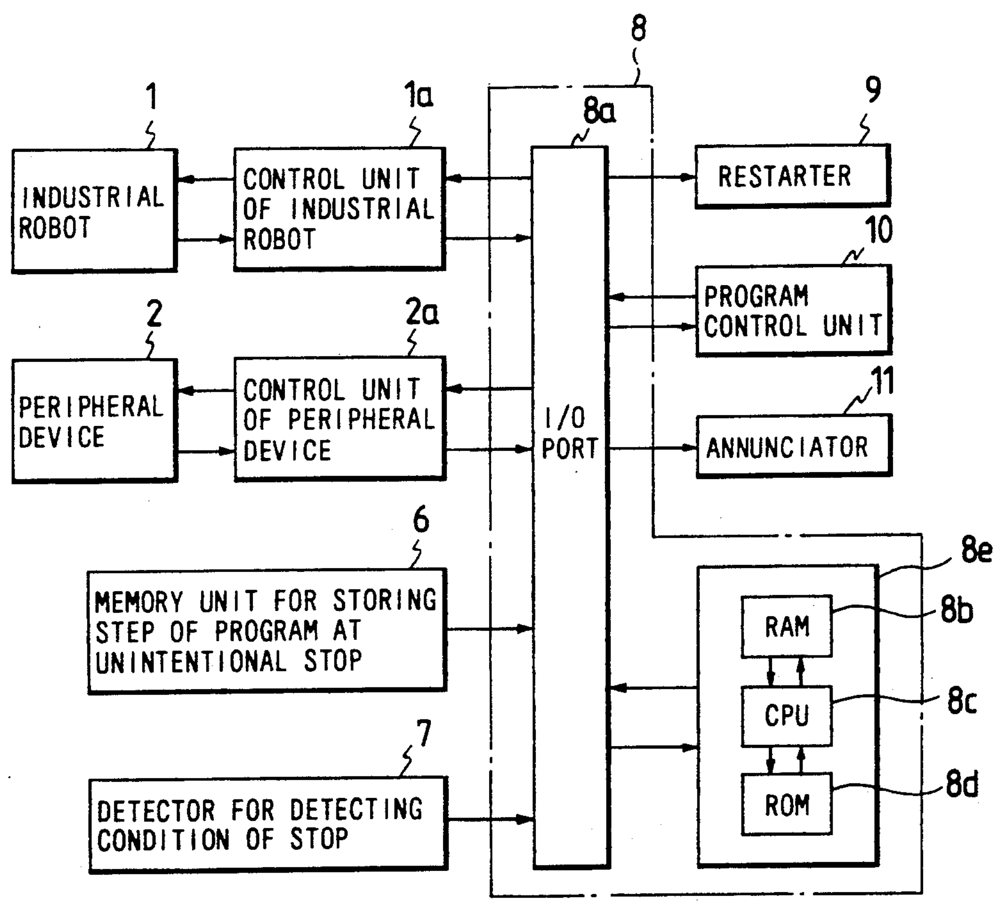
FIG. 3 is a block diagram showing an electrical connection in the industrial robot system in FIG. 1.

FIGS. 1 through 4 shows one embodiment of this invention, an industrial robot system.

In these figures, reference numeral 1 designates an industrial robot with a control unit including a program; 2, a first peripheral device comprising a pallet supplying conveyor installed near the industrial robot 1 and having a control unit 2*a* including a program; 3, pallets being conveyed by the first peripheral device 2; 4, a second peripheral device comprising a work material supplying conveyor whose end is set close to the industrial robot 1, the conveyor being a gravity conveyor for conveying work materials 5; 5', work materials 6 stacked on the pallet 3; 6, a memory unit for storing the step of the program which is effected when the industrial robot 1 is stopped unintentionally; 7, detectors provided above the industrial robot 1 and the first and second peripheral devices 2 and 4, each detector comprising an image recognizing device; 8, a control device which comprises an I/O port 8*a* and a computer 8*e* including a RAM 8*b*, a CPU 8*c* and a ROM 8*d*; 9, a restarter; 10, a program control unit; and 11, an annunciator.

Figure 4:
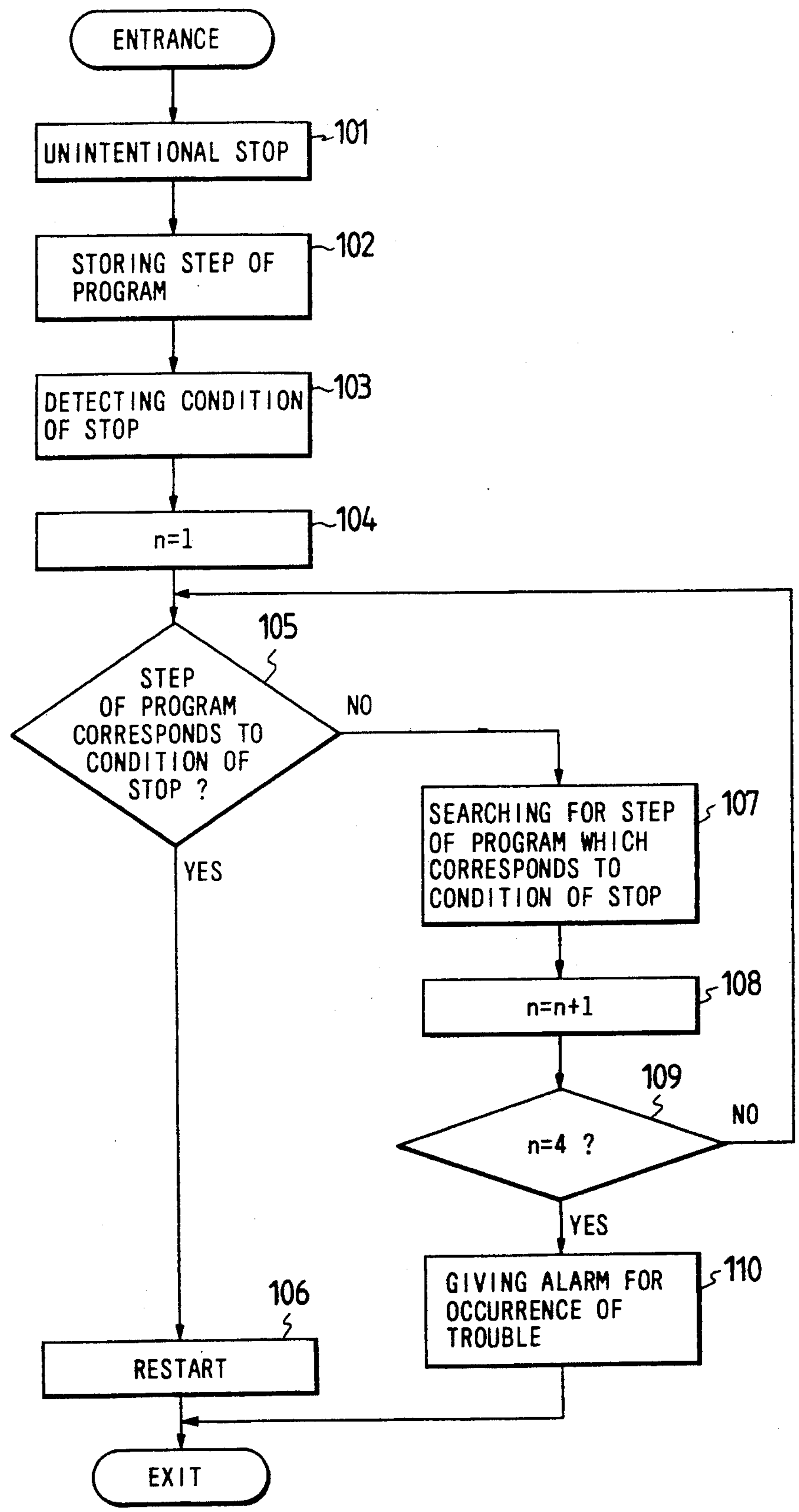
FIG. 4 is a flow chart for a description of the operation of the industrial robot system shown in FIG. 1.

In the industrial robot system thus organized, normally with the work materials 5 and the pallet 3 supplied, the industrial robot 1 operates to stack the work materials 5 on the pallet 3 according to the predetermined program executed by the control device 8. When the industrial robot system is stopped unintentionally, then a countermeasure is taken as shown in FIG. 4, a flow chart.

When the industrial robot system is stopped unintentionally for instance because the industrial robot 1 becomes out of order, or the power supply is stopped (Step 101), then in Step 102 the steps of the programs which are effected for the industrial robot and the peripheral devices when the system is stopped unintentionally are stored in the memory unit 6, and in Step 103 the conditions of the robot and peripheral devices provided when the system is stopped unintentionally are detected by the detectors 7. Then, Step 105 is effected after Step 104. When, in Step 105, the steps of the program which have been stored as described above coincide with the results of detection by the detectors, then Step 106 is effected so that the industrial robot system is started again by the restarter 9. If, in Step 105, the steps of the programs stored do not coincide with the results of detection, then in Step 107 the program control unit 10 searches for the steps of the programs which correspond to the results of detection of the conditions obtained when the system is stopped unintentionally (hereinafter referred to as "a program step search operation", when applicable). Then, Step 105 is effected again after Step 108 and Step 109. When, in Step 105, the steps of the programs thus searched for coincide with the results of detection of the conditions, then in Step 106 the system is started again. However, if the coincidence cannot obtained even after the above-described program step search operation is carried out, then the same operation is carried out again. If, although the program step search operation has been carried out three times, the steps of the programs thus searched for do not coincide with the detected conditions of the robot and the peripheral devices, then it is determined that a trouble occurs with the system; for instance, the work materials 5 have dropped off the robot 1, or the peripheral devices damaged. Hence, Step 110 is effected, so that the annunciator 11 is energized to output an alarm signal or the like, and the restarting of the industrial robot system is not carried out.

That is, when stopped unintentionally, the industrial robot system is operated correctly again, or depending on the conditions it is not restarted giving an alarm for the occurrence of a trouble.

As was described above, the industrial robot system of the invention comprises: the memory unit for storing the steps of the programs effected when the system is stopped unintentionally, the detectors for detecting the conditions of the robot and the peripheral devices when the system is stopped unintentionally, and the restarter, which is energized when the outputs of the memory and the detectors coincide with each other. Furthermore in the industrial robot system, the program control unit searches for the steps of the programs which correspond to the outputs of the detectors, and when it is impossible to restart the system, the latter is left as it is with the annunciator energized. Thus, when stopped unintentionally, the industrial robot system is operated correctly again, thus contributing to improvement of the productivity; and when it is impossible to restart the system, an alarm is given for the occurrence of the trouble with the system, thus enhancing the safety of the system.

What is claimed is:

1. An industrial robot system, comprising:

control means including programs for operating an industrial robot and a peripheral device of said industrial robot;

memory means for storing the steps of said programs which are then being performed when said industrial robot and peripheral device are stopped unintentionally;

detector means for detecting the conditions of said industrial robot and peripheral device when said industrial robot and peripheral device are stopped unintentionally;

restarter means for starting said industrial robot and peripheral device again when the contents of said memory means coincide with the conditions detected by said detector means; and further comprising:

annunciator means which operates when said restarter means cannot start said industrial robot and peripheral device within a predetermined number of attempts to dêtect coincidence between the contents of said memory means and the conditions detected by said detector means.

* * * * *